US010659329B1

(12) United States Patent
Zhao et al.

(10) Patent No.: US 10,659,329 B1
(45) Date of Patent: May 19, 2020

(54) CONTAINER DISTANCE MEASUREMENT AND CLUSTERING

(71) Applicant: EMC IP Holding Company LLC, Hopkinton, MA (US)

(72) Inventors: Junping Zhao, Beijing (CN); Kevin Xu, Warren, NJ (US); Sanping Li, Beijing (CN); Kun Wang, Beijing (CN); John Cardente, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 329 days.

(21) Appl. No.: 15/581,093

(22) Filed: Apr. 28, 2017

(51) Int. Cl.
*H04L 12/26* (2006.01)
*H04L 12/24* (2006.01)
*H04L 29/08* (2006.01)
*G06F 9/455* (2018.01)

(52) U.S. Cl.
CPC .......... *H04L 43/08* (2013.01); *H04L 41/0803* (2013.01); *H04L 67/1097* (2013.01); *G06F 9/45558* (2013.01); *G06F 2009/45562* (2013.01)

(58) Field of Classification Search
CPC . H04L 43/08; H04L 41/0803; H04L 67/1097; G06F 2009/45562; G06F 9/45558
USPC ........................................................ 709/224
See application file for complete search history.

(56) References Cited

U.S. PATENT DOCUMENTS

| 8,676,725 | B1* | 3/2014 | Lin ..................... G06N 20/00 706/12 |
| 9,697,028 | B1* | 7/2017 | Allen ................ G06F 9/45545 |
| 10,223,145 | B1* | 3/2019 | Neogy ............... G06F 9/45558 |
| 2011/0225277 | A1* | 9/2011 | Freimuth ........... G06F 9/45558 709/223 |

(Continued)

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

(Continued)

*Primary Examiner* — Moustafa M Meky
*Assistant Examiner* — Elizabeth Kassa
(74) *Attorney, Agent, or Firm* — Ryan, Mason & Lewis, LLP

(57) ABSTRACT

An apparatus in one embodiment comprises a plurality of container host devices of at least one processing platform. The container host devices implement a plurality of containers for executing applications on behalf of one or more tenants of cloud infrastructure. One or more of the container host devices are each configured to compute distance measures between respective pairs of the containers and to assign the containers to container clusters based at least in part on the distance measures. The distance measures may be computed as respective content-based distance measures between hash identifiers of respective layers of layer structures of the corresponding containers. The apparatus may further comprise an interface configured to present a visualization of the container clusters. User feedback received via the interface is utilized to alter at least one parameter of the computation of distance measures and the assignment of clusters to container clusters.

20 Claims, 5 Drawing Sheets

(56) References Cited

U.S. PATENT DOCUMENTS

| | | | |
|---|---|---|---|
| 2012/0076422 A1* | 3/2012 | Yang | G06K 9/6211 |
| | | | 382/201 |
| 2013/0318525 A1* | 11/2013 | Palanisamy | G06F 9/5066 |
| | | | 718/1 |
| 2016/0359680 A1* | 12/2016 | Parandehgheibi | H04L 63/1425 |
| 2017/0011091 A1* | 1/2017 | Chehreghani | G06F 16/22 |
| 2017/0076251 A1* | 3/2017 | Simske | G06K 17/0029 |
| 2017/0324813 A1* | 11/2017 | Jain | H04L 41/5009 |
| 2018/0152534 A1* | 5/2018 | Kristiansson | H04L 67/16 |

OTHER PUBLICATIONS

U.S. Appl. No. 15/189,447, filed in the name of Junping Zhao et al. filed Jun. 22, 2016 and entitled "Accelerated Data Access Operations."

U.S. Appl. No. 15/195,451, filed in the name of Accela Zhao et al. filed Jun. 28, 2016 and entitled "Container Image Layer Compaction."

U.S. Appl. No. 15/490,241, filed in the name of Junping Zhao et al. filed Apr. 18, 2017 and entitled "Grouping-Based Container Management and Data Services."

* cited by examiner

FIG. 4

```
#docker inspect redis
"Layers": [
"sha256:b6ca02dfe5e62c58dacb1dec16eb42ed35761c15562485f9da9364bb7c90b9b3",
"sha256:afbfb84fad8a4d9a9818efcb4f084bde4b14934c91a531ae344814a5191a2eb6",
"sha256:41829a143bccc7bee3849353e1ce4358d4cf1c7481f236d8194ea36113bf73d9",
"sha256:86726b2a83fc76e0eeabb1ae34b1a128e1bb41d1efc2242c0a39cd7b94ca2b98",
"sha256:5b0e63da2fb4bc9917bb6d00046cc7db229c15649cabe61439a6b2c0f01c5bf9",
"sha256:c418a51fc08117c4b436d1c4317dc4c567f1874abb9d7297b8d794ce3ac59407",
"sha256:eae6e471b603f3df6028a2a932a211707ce4032ab223e352b82ef62821d30a4c"
]
```

FIG. 5

Input: ImageA.hashID-A[X], ImageB.hashID-B[Y]
Output: distance d
1. Sort hashID-A[X] and hashID-B[Y] respectively
2. Compare them one by one and locate the first mismatch index, i.e. M
3. Continue and increase a counter C for each unmatched hashID until both are traversed, then return C/min(X, Y).

FIG. 6

|   | A | B | C | D | MORE CONTAINERS |
|---|---|---|---|---|---|
| A | 0 | 0.5 | 14 | 2.8 | ... |
| B |   | 0 | 1.5 | 6 | ... |
| C |   |   | 0 | 20 | ... |
| D |   |   |   | 0 | ... |
| MORE CONTAINERS |   |   |   |   | ... |

FIG. 7

700:
```
Input : Distance Matrix D for N images, filter
Output: Clusters[]
1. Sort distance matrix in ascending order. The closest are first.
2. Filter the TopX image pairs
 - if filter is d_max, make sure the image distance is <= d_max
 - if filter is cluster#, select TopK
 - Merge any duplicate images as one cluster if found in TopX, then
pick up more into Top
// this TopX cluster may consist of M unique images
3. For each remaining image i in (N - M), put it into one of above
clusters based on shortest Hamming distance (see 702 below).
```

702:
```
Distance between image i and Cluster G:
1. Calculate the Hamming distance btw image i and each member
image in Cluster G, then get the average distance (or min/max)
2. Calculate the Hamming distance btw image i and Virtual Common
Image of Cluster G
```

704:
```
Cluster 1: {image A, image B, image D, ...}
Cluster 2: {image C, image E}
Cluster 3: {image F}
...
```

FIG. 8

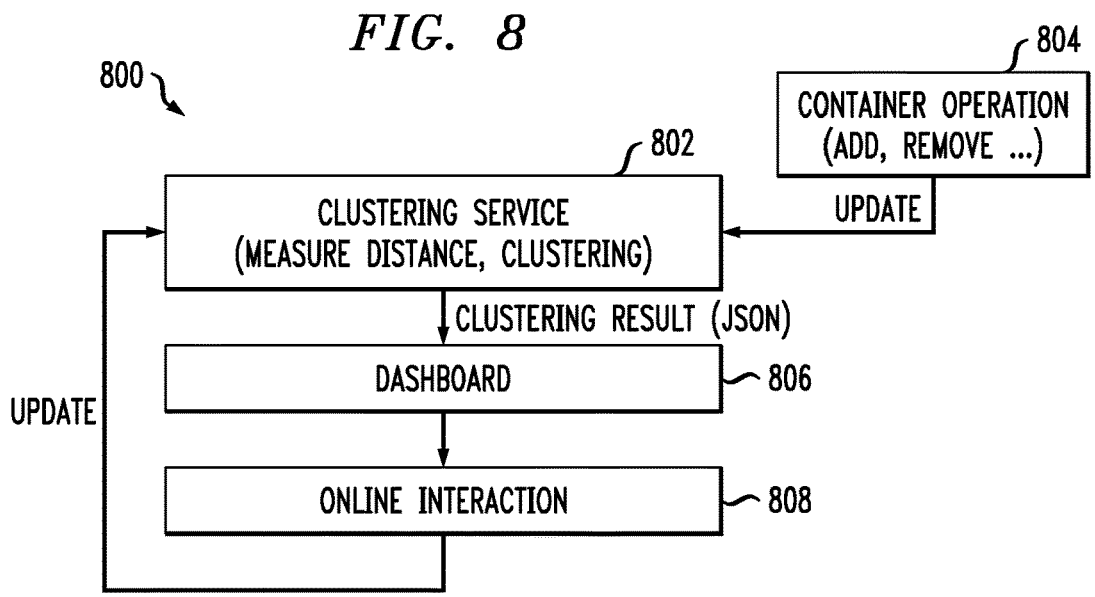

CONTAINER DISTANCE MEASUREMENT AND CLUSTERING

FIELD

The field relates generally to information processing systems, and more particularly to information processing systems comprising cloud infrastructure.

BACKGROUND

Information processing systems increasingly utilize operating system level virtualization techniques such as Linux containers. For example, it is increasingly common for a wide variety of different services to be built and delivered in containers. Such arrangements are in widespread use in cloud infrastructure. Information relating to containers that are developed for use in cloud infrastructure is often made available to users via public or private container registries, such as Docker Hub, that offer container image access. A significant problem that arises in this context is that it can be very difficult to determine the actual content of a given container or container image based on its name or tag as reflected in the container registry. For example, container developers may use names or tags that are not accurately descriptive of the actual content and functionality of the container or the container images. As a result, user search capabilities relating to container registries can be highly deficient under conventional practice. In addition, security concerns can arise with regard to mislabeled containers.

SUMMARY

Illustrative embodiments provide container distance measurement and clustering techniques in cloud infrastructure. Such arrangements can provide accurate and efficient detection and visualization of similar containers. As a result, container search capabilities are greatly improved, thereby facilitating container deployment, management and associated service optimization. Moreover, container security is enhanced as users are provided with an ability to distinguish legitimate containers from potentially fraudulent ones without having to rely solely on their respective names or tags.

In one embodiment, an apparatus comprises a plurality of container host devices of at least one processing platform. The container host devices implement a plurality of containers for executing applications on behalf of one or more tenants of cloud infrastructure. One or more of the container host devices are each configured to compute distance measures between respective pairs of the containers and to assign the containers to container clusters based at least in part on the distance measures.

The distance measures in some embodiments are computed as respective content-based distance measures between hash identifiers of respective layers of layer structures of the corresponding containers.

The apparatus may further comprise an interface configured to present a visualization of the container clusters. The interface may be configured to support entry of user feedback that alters at least one parameter of the computation of distance measures and the assignment of clusters to container clusters.

These and other illustrative embodiments described herein include, without limitation, methods, apparatus, systems, and computer program products comprising processor-readable storage media.

BRIEF DESCRIPTION OF THE DRAWINGS

FIG. 4 shows examples of container image layer hash identifiers that may be used for container distance measurement in an illustrative embodiment.

FIG. 5 is example pseudocode for container distance measurement utilizing container image layer hash identifiers in an illustrative embodiment.

FIG. 6 shows an example of a container distance matrix in an illustrative embodiment.

FIG. 7 is example pseudocode for assigning containers to container clusters based at least in part on distance measurements in an illustrative embodiment.

FIG. 8 is a flow diagram of a process for online interaction with a container distance measurement and clustering service in an illustrative embodiment.

DETAILED DESCRIPTION

Illustrative embodiments will be described herein with reference to exemplary information processing systems and associated host devices, storage devices and other processing devices. It is to be appreciated, however, that these and other embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Such systems are considered examples of what are more generally referred to herein as cloud computing environments. The term "cloud infrastructure" as used herein is intended to be broadly construed to encompass these and other information processing system environments that include at least a portion of at least one cloud.

Figure 1:
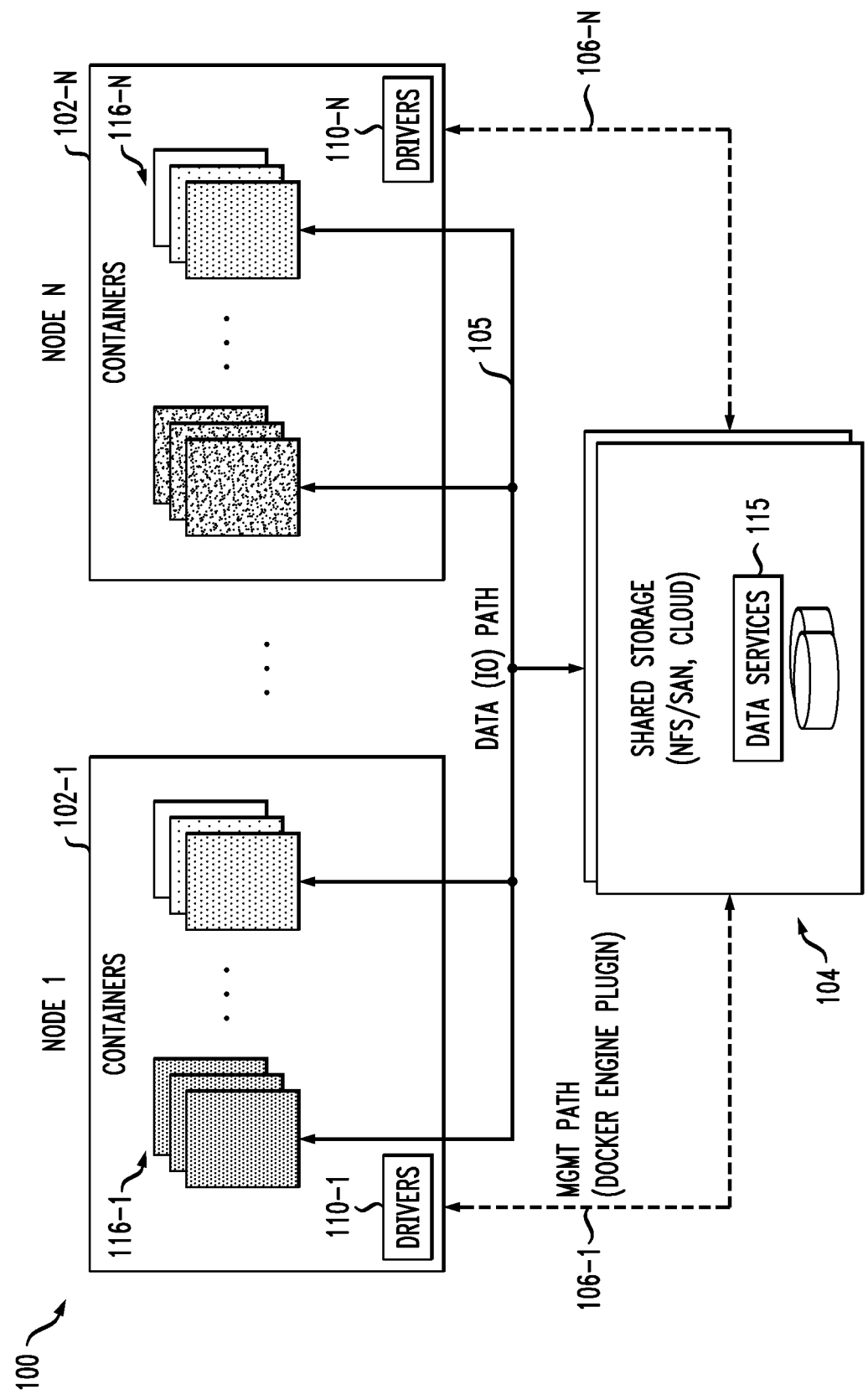
FIG. 1 is a block diagram of an information processing system configured for container distance measurement and clustering in an illustrative embodiment.

FIG. 1 shows an information processing system 100 configured to implement functionality for container distance measurement and clustering in cloud infrastructure. The system 100 comprises at least one processing platform implementing a plurality of container host devices configured as a plurality of nodes 102-1 through 102-N, also denoted as Node 1, ... Node N, respectively. The container host devices providing the nodes 102 are examples of what are more generally referred to herein as "processing devices" of the one or more processing platforms of the system 100. Each such processing device of a given processing platform comprises at least one processor coupled to a memory. A given one of the nodes 102 can illustratively comprise a single container host device. Alternatively, one or more of the nodes 102 can each comprise a plurality of container host devices.

At least a subset of the container host devices may comprise respective virtual machines controlled by a hypervisor of the processing platform, although numerous other types of container host devices may be used.

The nodes 102 can illustratively comprise respective compute nodes of the cloud infrastructure. For example, the nodes 102 can comprise respective compute nodes of an Amazon Web Services (AWS) system. Other examples of cloud-based systems that can be used to implement nodes 102 and possibly other portions of system 100 include Google Cloud Platform (GCP) and Microsoft Azure.

The nodes 102 may be implemented on a per-tenant basis and extend in a distributed manner across container host devices of multiple public, private or hybrid clouds.

A given such cloud can comprise a Platform-as-a-Service (PaaS) layer overlying an Infrastructure-as-a-Service (IaaS) layer. The IaaS layer comprises a plurality of virtual machines supporting application containers of the PaaS layer. For example, container host devices in such an embodiment are assumed to correspond to respective ones of the virtual machines of the IaaS layer.

It should be noted that references above and elsewhere herein to container host devices should not be viewed as limiting in any way. Other embodiments can utilize other types of host devices, including virtual machines and "bare metal" hosts. The term "host device" as used herein is therefore intended to be broadly construed.

The nodes 102 in the present embodiment share a common storage system 104, also referred to as "shared storage." The nodes 102 have data access to the storage system 104 via an input-output (IO) data path 105. The nodes 102 also communicate with the storage system 104 via respective management ("Mgmt") paths 106, illustrated by dashed arrows in the figure. More particularly, node 102-1 communicates with storage system 104 over management path 106-1 via a set of one or more drivers 110-1. Similarly, node 102-N communicates with storage system 104 over management path 106-N via a set of one or more drivers 110-N. The drivers 110 associated with the respective management paths 106 illustratively correspond to respective extended engine plugins, such as Docker engine plugins.

The storage system 104 in the present embodiment provides data services 115 for containers 116 of the nodes 102.

The nodes 102-1 through 102-N more particularly comprise respective sets of containers 116-1 through 116-N. A given such set of containers or a portion of such a set of containers may be associated with a particular tenant of the system 100. Different storage volumes or other portions of the storage system 104 are illustratively allocated to respective ones of the containers 116.

Examples of data services 115 that may be provided for containers 116 include data caching services, storage tiering services, data deduplication services, networking services and data security services. Numerous other types of data services may additionally or alternatively be implemented for particular containers. Some of the data services 115 may run at least in part in the corresponding container host devices. For example, caching services may involve one or more caches of respective container host devices. As another example, tiering hints for a storage tiering service can be generated in the container host devices. As a further example, one or more deduplication domains for a deduplication service may be in a container host device rather than in the storage system 104.

The containers 116 may be automatically arranged in multiple groups for efficient container management and/or for provision of similar data services or other related functionality to the particular containers of each group, as described in U.S. patent application Ser. No. 15/490,241, filed Apr. 18, 2017 and entitled "Grouping-Based Container Management and Data Services," which is incorporated by reference herein. For example, the containers on one or more of the nodes 102 may be separated into at least first and second distinct container groups based at least in part on results of comparisons of layer structures each characterizing container images of respective different ones of the containers. It is to be appreciated, however, that utilization of such container grouping techniques is not required for illustrative embodiments of the present disclosure.

As indicated above, the containers 116 are illustratively configured for executing applications on behalf of one or more tenants of cloud infrastructure of the system 100. Such cloud infrastructure of system 100 illustratively comprises at least portions of the nodes 102 and the storage system 104. For example, different ones of the nodes 102 may be associated with different tenants. Additionally or alternatively, multiple ones of the nodes 102 may be associated with a single one of the tenants.

It is assumed in this embodiment that each of the nodes 102 is configured in a similar manner. For example, the nodes 102 comprise respective drivers 110 for supporting sets of containers 116. The drivers 110 may comprise respective container image storage drivers including block-based storage drivers such as DeviceMapper ("DM") or file-based storage drivers such as Advanced multi-layered Unification File System (AUFS). Other alternative drivers include ZFS storage drivers, and many others. Combinations of multiple such distinct drivers can also be used. The nodes 102 may be coupled via IO data path 105 to external bind volumes in the shared storage of storage system 104. Such shared storage arrangements between the containers of the nodes 102 are illustratively implemented via corresponding Docker volume plugin modules such as REX-Ray from Dell EMC.

In the system 100 of FIG. 1, the containers 116 are assumed to have associated layer structures each characterizing container images of respective different ones of the containers. Such structures are also referred to herein as container image layer structures.

A layer structure in some embodiments comprises one or more read-only (RO) layers each associated with one or more container images, and one or more read-write (RW) layers each associated with at least one running instance of at least one of the containers. A more detailed example of such a layer structure will be described below in conjunction with FIG. 2. Other types of layer structures can be used in other embodiments.

The layer structures illustratively characterize container data associated with one or more of the containers 116. The term "container data" as used herein is intended to be broadly construed so as to encompass, for example, at least portions of one or more container images, possibly including static data files, as well as other types of container information associated with respective running containers such as libraries, executables, configuration files, etc. These and other types of information are intended to be encompassed by the term "container data" as used herein and may be utilized in container distance measurement and clustering in illustrative embodiments. Accordingly, container data subject to distance measurement and clustering based on container image layer structures can include libraries, executables, configuration files and other container information required for a running container, as well as data to be processed by the running container.

The container host devices comprising nodes 102 and the corresponding shared storage comprising storage system 104 are further assumed to comprise multiple distinct storage devices, such as different electronic storage devices and disk-based storage devices, or other types of storage devices in any combination. The term "storage device" as used herein is intended to be broadly construed so as to encompass, for example, at least a portion of a cache or persistent storage of a container host device, at least a portion of an electronic memory or disk-based memory of the storage system 104, or other types and arrangements of memory that may be implemented in system 100.

As indicated above, the system 100 is configured to implement container distance measurement and clustering functionality for the containers 116. In accordance with that functionality, one or more of the container host devices are each configured to compute distance measures between respective pairs of the containers and to assign the containers to container clusters based at least in part on the distance measures.

Although not explicitly illustrated in the figure, the system 100 can further include an interface configured to present a visualization of the container clusters. An example of such an interface is the dashboard referred to in the context of the embodiment to be described below in conjunction with FIG. 8.

The visualization can illustratively include a distance matrix having rows and columns corresponding to respective ones of the containers and entries corresponding to the computed distance measures between respective pairs of the containers, as illustrated in the example distance matrix shown in FIG. 5.

Numerous other types of interfaces and visualizations can be used in other embodiments. For example, a dashboard or other interface may be configured to support entry of user feedback. In such an arrangement, at least one parameter of the computation of distance measures and the assignment of clusters to container clusters is altered based at least in part on user feedback received via the interface.

It is assumed without limitation that the distance measures in system 100 are computed between layer structures of the corresponding containers 116. For example, the distance measures may be computed as respective content-based distance measures between hash identifiers of respective layers of layer structures of the corresponding containers.

The distance measure for a given one of the pairs of containers in some embodiments is computed as a Hamming distance between hash identifiers of respective layers of layers structures of the corresponding containers. For example, the Hamming distance for the given one of the pairs of containers may be computed as:

$$d = C/\min(X, Y)$$

where d is the Hamming distance, C denotes a count of mismatched layers between the layer structures of the corresponding containers, and X and Y denote respective total numbers of layers in the layer structures of the corresponding containers.

After the distance measures are determined, the containers are assigned to the container clusters based on the distance measures. For example, the containers may be assigned to the container clusters by sorting distance measures for respective pairs of the containers in a designated order and applying at least one filter to the sorted distance measures to assign particular pairs of the containers to particular ones of the container clusters. Other types of container cluster assignment techniques may be used.

The container clusters can be used for a wide variety of different purposes. For example, different data services may be implemented by each of one or more of the container host devices for different ones of the container clusters.

Changes in the layer structures can be tracked within the system 100 and the computation of distance measures and assignment of containers to container groups repeated such the container clusters vary dynamically over time.

The container distance measurement and clustering functionality in this embodiment may be implemented at least in part in software modules of the respective nodes 102. A given such module within a given one of the nodes 102 may be arranged between the one or more drivers 110-1 and a corresponding host device cache subsystem illustratively comprising a host cache and associated cache swapping control. Other arrangements of modules are possible in other embodiments.

Some embodiments are configured such that a given container can belong to only one cluster at a time, although other embodiments can support container membership in multiple clusters. The container cluster information of a given container is illustratively stored in pre-defined metadata files with other container metadata. One or more application programming interfaces (APIs) are provided to allow access to such container cluster information. For example, an API can be configured to support various container clustering information queries such as listing all container clusters and listing all containers in a specified cluster. Container clustering information can be updated or removed as necessary within the system.

In some embodiments, container distance measurement and clustering can be implemented using background threads to periodically scan container image layer structures to compute container distance measurements and to cluster the corresponding containers based on container distance measurements.

As indicated previously, at least portions of the information processing system 100 are implemented in cloud infrastructure. The cloud infrastructure of the system 100 can comprise a public cloud, a private cloud or a hybrid cloud or an associated data center or other type of system implemented on one or more processing platforms. The term "cloud" as used herein is intended to be broadly construed so as to encompass, for example, combinations of multiple clouds of different types.

The nodes 102 are coupled to the storage system 104 over at least one communication network which is not explicitly shown in the figure. Such a network or networks support the IO data path 105 and management paths 106-1 through 106-N.

In some embodiments, the storage system 104 is implemented as part of the cloud infrastructure of the system 100. Alternatively, the storage system 104 can be implemented at least in part externally to that cloud infrastructure.

As noted above, the containers 116 of the nodes 102 are implemented utilizing a plurality of container host devices. The containers support execution of applications on behalf of one or more tenants of the cloud infrastructure.

For example, cloud native applications can execute in respective application containers implemented utilizing the container host devices. The container host devices may comprise Docker containers, LXD containers, Cloud Foundry Diego-based containers or other types of containers. The data required for execution of the cloud native applications is obtained from the storage system 104.

The storage system 104 can comprise any of a variety of different types of storage including network-attached storage (NAS), storage area networks (SANs), direct-attached storage (DAS), distributed DAS and software-defined storage (SDS), as well as combinations of these and other storage types. The storage platforms can be configured to provide storage for data of multiple distinct types, including blocks, objects and files.

By way of example, as illustrated in the FIG. 1 embodiment, storage system 104 of system 100 is assumed to comprise at least one of network file system (NFS) SAN-based storage and cloud-based storage.

Cloud-based storage of storage system 104 may comprise at least one object store implemented using cloud storage such as Elastic Cloud Storage (ECS) from Dell EMC. Other examples of object stores that can be utilized to provide at least a portion of storage system 104 in some embodiments include Amazon Simple Storage Service (S3), GCP Cloud Storage, and Microsoft Azure Blob Storage.

In some embodiments, the storage system 104 is implemented as a multi-tier storage system comprising at least a fast tier and a capacity tier. The fast tier illustratively comprises non-volatile electronic memory and the capacity tier comprises at least one object store. Tiering hints from applications running in the containers are used to control movement of data between the fast and capacity tiers.

The example storage system configurations described above may be part of the same processing platform or platforms that also implement cloud infrastructure used to provide at least a subset of the nodes 102.

The containers of the nodes 102 are assumed to utilize copy-on-write (COW) techniques to provide point-in-time logical views of the data from storage system 104 that is processed by those containers.

For example, COW allows multiple containers to share access to data stored in the storage system 104. If an application process in a given one of the containers needs to modify a file, block, object or other item of shared data, a separate local copy of that data item is generated on which the given container can make its modifications, while the original shared data item visible to other ones of the containers remains unchanged. These and other COW techniques typically store the resulting multiple copies in the form of layers in which each layer stores only the modifications relative to one or more other layers.

A given running container on one of the nodes 102 of the system 100 is launched utilizing one or more container images. The container images are illustratively part of a layer structure 200 of the type shown in FIG. 2.

Figure 2:
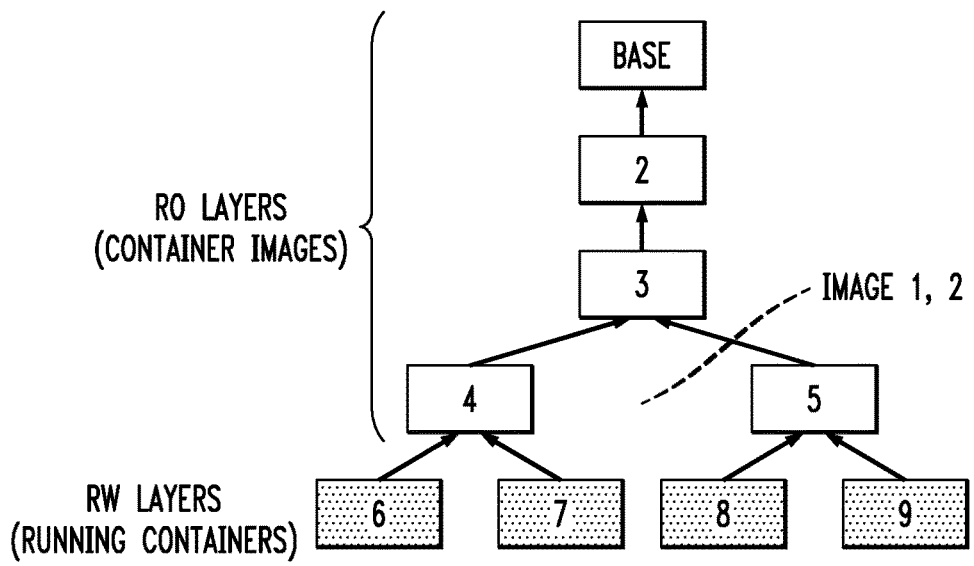
FIG. 2 shows an example of a container image layer structure associated with a plurality of containers in an illustrative embodiment.

In the example layer structure 200 of FIG. 2, there are multiple RO layers associated with respective container images and multiple RW layers associated with multiple running containers that utilize those container images. The RO layers comprise static container images and the RW layers comprise running container instances based on container images that are loaded into memory. The layer structure 200 is in the form of a tree-like hierarchy, with parent-child relationships between the container images of the various layers. Other types of layer structures can be used in other embodiments.

For purposes of illustration, illustrative embodiments will be described herein in the context of the well-known Docker application container framework, although it is to be understood that embodiments can be implemented with other types of container-based application frameworks or snapshot-based applications.

The container images of the respective RO layers in the Docker context include respective differential or "delta" layers each created in conjunction with a corresponding COW operation. A given running container is part of an RW layer and is created utilizing a container image of an immediately overlying RO layer which is itself related back through the layer structure to a base RO layer via one or more intermediate RO layers. Multiple related RO layers of the layer structure therefore collectively provide the single container image that is utilized to generate the given running container.

Container image layer structures of the type described above can grow increasingly complex, particularly in dense container deployments. Accordingly, illustrative embodiments can incorporate efficient container image layer structure access and processing techniques as disclosed in U.S. patent application Ser. No. 15/189,447, filed Jun. 22, 2016 and entitled "Accelerated Data Access Operations," and U.S. patent application Ser. No. 15/195,451, filed Jun. 28, 2016 and entitled "Container Image Layer Compaction," both of which are incorporated by reference herein in their entirety. Such techniques provide significant improvements in the processing of large numbers of potentially complex container image layer structures with a given dense container deployment.

In the FIG. 2 example, the RO layers of the layer structure include a base RO layer comprising a base container image and intermediate RO layers comprising additional container images denoted 2, 3, 4 and 5. The RW layers of the layer structure include container images denoted 6, 7, 8 and 9 of respective multiple running containers. Such running containers are also referred to as active containers. It can be seen from the figure that active containers corresponding to container images 6 and 7 share container image 4 of the immediately overlying RO layer. Similarly, active containers corresponding to container images 8 and 9 share container image 5 of the immediately overlying RO layer. Container images 4 and 5 of this immediately overlying RO layer in turn relate back to the base RO layer via container images 3 and 2 of respective intermediate RO layers.

As indicated above, the layer structure 200 illustratively supports multiple container images, including by way of example container images denoted as Image1 and Image2, collectively referred to as "Image1, 2" in the figure. These two example container images share some common portions of the RO layers and also include respective unique portions of the RO and RW layers. More particularly, Image1 illustratively comprises the base RO layer and RO layer portions 2, 3 and 4, and has two running container instances 6 and 7 corresponding to respective ones of the RW layers. If those two container instances are deleted, the corresponding portions of the RW layers will be removed. Similarly, Image2 illustratively comprises the base RO layer and RO layer portions 2, 3 and 5, and has two running container instances 8 and 9. Again, if those two container instances are deleted, the corresponding portions of the RW layers will be removed.

In this example, the base RO layer and RO layer portions 2 and 3 are common for Image1, 2 and the other RO and RW layer portions are unique for each of Image1, 2. This separation between the common and unique portions of the RO and RW layers for Image1, 2 is illustrated by the dashed line in the figure.

The active containers can read data items referenced by the container images of the RO layers. If a given one of the active containers wants to modify one or more of those data items, a COW operation is performed and the given active container can then perform write operations on its local copy. Such modifications lead to one or more additional differential container images of one or more RO layers. For example, a temporary RW layer may be created via COW for a given active container, and later removed after run or commit in conjunction with generation of a new durable RO layer. Accordingly, the layer structures of the system 100 vary over time as the containers access and modify data items associated with the various container images of those layer structures.

An initial access to particular data by an application running in a container triggers a traversal of the RO layers of the layer structure in order to locate the data and copy it via COW into the temporary RW layer. This COW process illustratively follows a "bottom-up access" pattern from the RW layers through the intermediate RO layers to the base RO layers of the layer structure 200.

As mentioned previously, the system 100 is configured to utilize layer structures such as container image layer structure 200 of FIG. 2 to compute distance measures between respective pairs of containers, and to cluster the containers into container clusters based at least in part on the distance measures.

Illustrative embodiments advantageously overcome problems of conventional arrangements, such as a lack of awareness of container image layer structures in container clustering techniques, which can otherwise lead to sub-optimal performance. For example, some embodiments provide highly efficient distance measurement based clustering of containers using hashes of container image layer structures. Such arrangements can measure inter-container distances in an accurate and rapid fashion without the need for brute force computing or other similar computation-intensive techniques.

Figure 3:
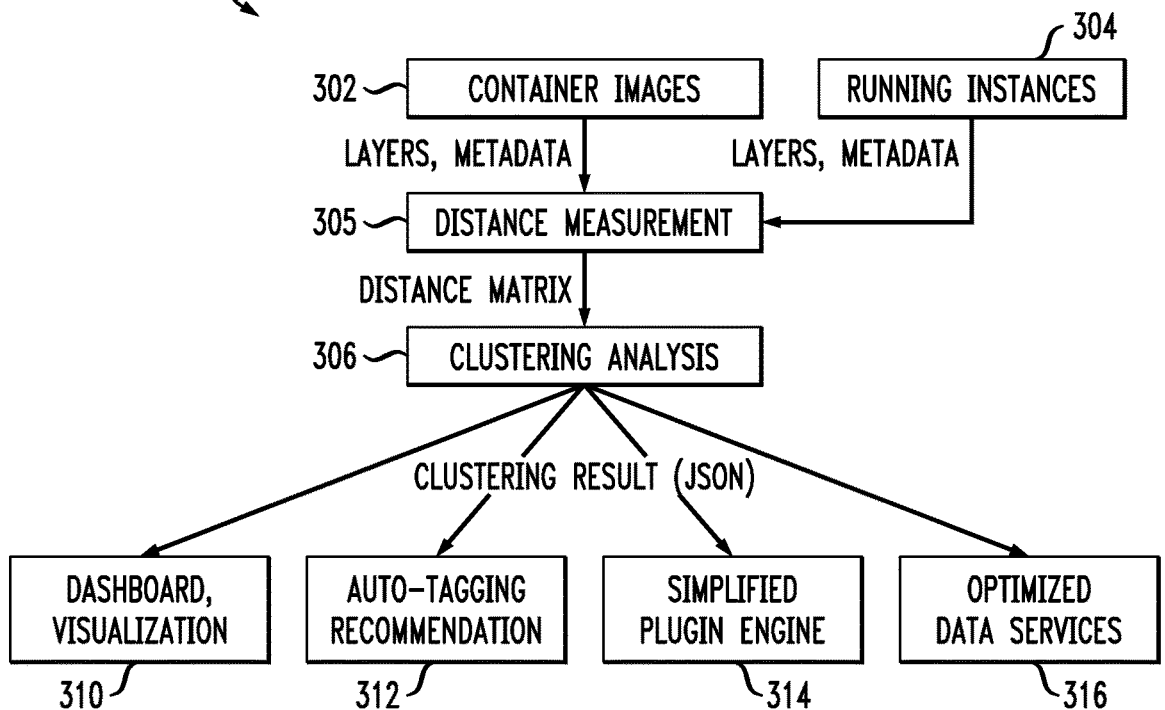
FIG. 3 is a flow diagram of a process for container distance measurement and clustering in an illustrative embodiment.

Referring now to FIG. 3, a process 300 is shown for container distance measurement and clustering in an illustrative embodiment. The container distance measurement and clustering process 300 in this embodiment receives as its inputs layers and associated metadata for container images 302 and running instances 304 of containers. The process includes a distance measurement step 305, a clustering analysis step 306, and additional steps 310, 312, 314 and 316 that utilize clustering results as illustrated.

The container distance measurement of step 305 in this embodiment is content-based distance measurement, and more particularly is based on measurement of distance between hash identifiers of layer structures of the corresponding containers.

Assuming again the use of Docker containers, such containers utilize layer and/or container image identifiers such as layer. DiffID and ChainID, as summarized in Table 1 below. These identifiers are in the form of content-based hash identifiers generated by applying the SHA256 secure hashing algorithm to the corresponding layer or container image in the manner indicated in the table. Layers or container images having identical content will have the same SHA256 based identifier. Such identifiers generated using SHA256 are examples of what are more generally referred to herein as "hash identifiers," which are also denoted herein as hashIDs. Other types of hashing algorithms may be used to generate hash identifiers from layer structures in other embodiments.

TABLE 1

Example Content-Based Hash Identifiers Representing Layer/Image

| ID Type | Meaning | Calculation |
| --- | --- | --- |
| layer.DiffID | ID for an individual layer | DiffID = SHA256hex(uncompressed layer tar data) |
| layer.ChainID | ID for a layer and its parents. This ID uniquely identifies a filesystem composed of a set of layers. | For bottom layer: ChainID(layer0) = DiffID(layer0). For other layers: ChainID(layerN) = SHA256hex(ChainID(layerN-1) + . . . + DiffID(layerN)) |
| image.ID | ID for an image. Since the image configuration references the layers the image uses, this ID incorporates the filesystem data and the rest of the image configuration. | SHA256hex(imageConfigJSON) |

In step 305, distance measurements are performed between respective pairs of the containers utilizing the hash identifiers of their corresponding layer structures. Examples of the hash identifiers include the SHA256 based hash identifiers 400 shown in FIG. 4. Such identifiers are usually cached as metadata in the container host devices and can therefore be rapidly retrieved for use in generating distance measurements as part of the process 300. In the FIG. 4 arrangement, the hash identifiers are illustratively obtained using a command of the form "docker inspect <image|container>." Additionally or alternatively, a Docker Go API can be used to obtain the hash identifiers.

FIG. 5 shows example pseudocode 500 for container distance measurement utilizing container image layer hash identifiers in step 305 of the process 300. This pseudocode is used to calculate distance measures between any two container images, denoted as Image A and Image B. The FIG. 5 pseudocode is repeatedly applied to additional pairs of containers to generate respective additional distance measurements.

The pseudocode 500 computes the distance between the two arbitrary images Image A and Image B, utilizing the hash identifiers of respective layers of their layer structures. As described previously herein, the distance measure could be computed as a Hamming distance between hash identifiers of respective layers of layers structures of the corresponding containers. For example, the Hamming distance may be computed as:

$$d = C/\min(X, Y)$$

where d is the Hamming distance, C denotes a count of mismatched layers between the layer structures of the corresponding containers, and X and Y denote respective total numbers of layers in the layer structures of the corresponding containers. A shorter Hamming distance means that the containers share some or many layers, while a longer Hamming distance means that the containers share few or no layers. The Hamming distance could be any positive number, and the minimum Hamming distance is zero.

In the pseudocode 500, the counter is increased if one hashID set has reached its final entry but the other hashID set has not. For example, comparison of a hashID for Image A to a null entry for Image B is a mismatch and the counter is increased. Also, the pseudocode 500 ignores the original position of a given hashID in the set. Accordingly, in some cases a given Image A hashID denoted hashID-A[x] may be equal to an Image B hashID denoted hashID-B[y] even if x is not equal to y. However, since the hashIDs are generated from content in the form of image layers, such an occurrence is unlikely. Alternatively, the distance measurement algorithm can be slightly adjusted so that only hashIDs at matched positions are compared. Such an arrangement considers ordering of the layers and their respective hashIDs in the layer structure, and only compared layers with equal hashIDs at the same position will be marked as matched so as to trigger an increase in the counter.

As another possible alternative, the distance measurement algorithm implemented in the pseudocode 500 of FIG. 5 can be modified such that equality of hashIDs at the same position within the layer structure is more heavily weighted in the counter adjustment. For example, equal hashIDs at the same position in each image are considered an exact match such that the counter value is increased by +1, but equal hashIDs at different positions in each image would increase the counter value by only +0.5, while non-equal hashIDs would not increase the counter at all regardless of position.

It is also possible that alternative distance measures such as Jaccard similarity may be used in place of Hamming distance. Other alternatives includes various similarity measures based on the frequency at which particular strings or other items appear in the two compared container images.

In some embodiments, the distance measures that are generated are weighted using additional container-related features such as image run entryPoint, command, and exposed IP port, which characterize aspects of the behavior of a running container. Such features can be accessed via an API or a "docker inspect" command.

The output of the distance measurement process in step 305 is a distance matrix such as distance matrix 600 of FIG. 6. In this distance matrix, each of a plurality of containers A, B, C, D and others is compared to other ones of those containers in order to generate distant measures for respective container pairs. Each entry in the distance matrix includes a distance measure between container i and container j. The entries along the diagonal are zero because the distance between a given container and itself is zero.

In step 306, clustering analysis is performed in order to assign the containers to clusters based at least in part on the distance measurements. This can be done in an automatic or interactive manner. A given clustering result is illustratively in JavaScript Object Notation (JSON), although a wide variety of other formats could be used.

The clustering results from step 306 are applied to a dashboard in order to generate one or more visualizations in step 310. A given such visualization may include a distance matrix of the type shown in FIG. 6.

Additionally or alternatively, the clustering results are used for auto-tagging and/or recommendation generation in step 312, for a simplified plugin engine in step 314, and for provision of optimized data services in step 316.

For example, particular containers can be auto-tagged in step 312 with an appropriate name that is descriptive of their actual content based on their respective cluster membership, in place of possibly non-descriptive or misdescriptive names that may have been assigned by the creators of those containers.

Also in step 312, recommendations of similar or related containers or container images could be provided to users in response to a container or container image search.

With regard to step 314, containers that are assigned to the same container cluster can share a common plugin engine, resulting in a considerable simplification of the overall plugin engine arrangements of a given system.

In step 316, various data services available within the system can be optimized for each container cluster. As a result, the member containers of each cluster are thereby provided with more appropriate data services.

FIG. 7 shows example pseudocode 700, 702 and 704 for assigning containers to container clusters based at least in part on distance measurements. This clustering analysis performed in step 306 of the process 300 illustratively involves sorting distance measures for respective pairs of the containers in a designated order and applying at least one filter to the sorted distance measures to assign particular pairs of the containers to particular ones of the container clusters.

The pseudocode 700 in the FIG. 7 embodiment receives as its inputs a distance matrix D for N images, and a filter designation. The distance matrix entries are sorted in ascending order with the image pairs that are "closest" to one another in terms of having the shorted distance measures are first in the sorted list. The filter then identifies a designated number of top image pairs ("TopX") in the sorted list.

For example, the filter may be based on a specified distance criterion such as a maximum distance threshold d_max. In such an arrangement, only those image pairs having distance measures less than or equal to d_max are considered for inclusion in a cluster. The value of d_max can be configured by a system administrator and could be determined based at least in part on container clustering experiments carried out within a given dense container deployment. The use of d_max or another type of distance criterion allows the clustering algorithm to automatically cluster those containers that meet the criterion.

As another example, the filter could be based on designation of a particular number of clusters K, such that the algorithm terminates when K clusters each meeting certain parameters are obtained.

In the pseudocode 702, the remaining images that are not assigned to a cluster based on the above-described filtering are each assigned by determining the Hamming distance between that image and the member images of each cluster using one of two possible approaches. The first approach calculates the Hamming distance between a given image and each of the images of a cluster on a pair-wise basis and then takes the average, the minimum or the maximum of the resulting distance measures. The second approach utilizes what is referred to herein as a Virtual Common Image (VCI). This is an image that does not physically exist but consists of the common shared layers of images assigned to the corresponding cluster. In the second approach, the Hamming distance between the given image and the VCI is determined and utilized as the distance between the given image and the corresponding cluster. The distance measures generated using these approaches are used to assign remaining ones of the N images to particular ones of the clusters.

The resulting output of the clustering analysis is illustrated by the pseudocode 704, and indicates for each of the clusters the particular images that have been assigned to those clusters in step 306 of the process 300. Those images are also referred to as "members" of their respective corresponding clusters.

The assignment of images to container clusters should have a sufficiently high confidence level such that those containers that share many common layers in their respective layer structures will almost certainly be part of the same cluster. However, it is possible that some containers that utilize proprietary or modified layers may lead to a "miss" alarm in the process.

The assignment of images to container clusters may be configured with certain restrictions, such as a certain minimum or maximum number of clusters each required to include at least one member image. Another requirement may be that each container image must belong to one of the clusters.

Alternative clustering techniques such as various implementations of K-means clustering or hierarchical clustering can be used in other embodiments.

Referring now to FIG. 8, an example process 800 is shown for online interaction with a container distance measurement and clustering service 802 in an illustrative embodiment. The container distance measurement and clustering service 802, also referred to as simply a "clustering service," receives updates relating to container operation 804 within a given system. Such updates can relate, for example, to adding or removing of containers. The clustering service 802 generates distance measurements between container pairs based on their respective layer structures including container images and possibly other types of container data. The clustering results are possibly in JSON format and are provided to a dashboard 806 for generation of one or more visualizations. For example, a visualization based at least in part on a distance matrix of the type shown in FIG. 6 can be generated. Numerous other types of graphs, charts, tables or other visualizations can be generated and presented to users via the dashboard 806.

The dashboard 806 in this embodiment is configured to support online interaction 808 with one or more system users. For example, the online interaction 808 can include entry of user feedback. The feedback in this embodiment is provided to the clustering service 802 as one or more updates that are utilized to alter at least one parameter of the computation of distance measures and the assignment of clusters to container clusters. Although shown as separate from the dashboard 806, the updates based on the online interaction 808 can be provided to the clustering service 802 via the dashboard 806.

In some embodiments, the dashboard 806 can be configured to allow a user to specify expected cluster number or other clustering parameters, to zoom in or zoom out on a particular visualization, and to click and jump to container detail pages. Additional information can be embedded into the visualization, such as running container instance number and running container status.

Additionally or alternatively, the dashboard 806 can be configured to support user performance of container management operations such as adding or pulling images, committing new images and removing image.

The clustering service 802 in some embodiments is configured as a background service that updates the container distance measurements and container cluster assignments at regular intervals or upon request by an administrator.

The clustering service 802 can itself be packaged in the form of a container and integrated into a PaaS platform such as Cloud Foundry.

The dashboard 806 is illustratively configured to support automatic tagging of containers in terms of their actual content independent of the particular names assigned to those containers by their creators. Additionally or alternatively, container image search functionality and associated recommendations can be provided to system users.

Illustrative embodiments can also be integrated into public or private container image registries or container registries to facilitate user access to existing container images or containers having particular desired types of content or functionality.

Simplified plugin engine arrangements can be provided in a given system by allowing containers that are sufficiently similar to other containers to share an optimized plugin engine and associated optimized data services.

In some embodiments, container distance measurement and clustering functionality is integrated with existing system functionality. For example, existing container monitoring and metadata configurations can be extended in a straightforward manner to support container distance measurements and clustering as disclosed herein. Distance measurement and clustering modules can be provided as part of an extended engine plugin of a Docker engine or other type of container control engine. Existing APIs can be extended or new APIs added to support access to container distance measurement and clustering information.

The disclosed container distance measurement and clustering functionality can be readily integrated with existing container management technologies such as SWARM and Kubernetes. In addition, the disclosed container distance measurement and clustering functionality can be utilized with a wide variety of different types of storage systems, including storage systems comprising ScaleIO™ software-defined storage and/or Isilon® platform nodes, both from Dell EMC. For example, a given multi-tier storage system referred to herein can include a fast tier implemented at least in part using ScaleIO™ software-defined storage and a capacity tier implemented at least in part utilizing a scale-out NAS cluster comprising Isilon® platform nodes. Both ScaleIO™ and Isilon® support Docker volume plug-ins using REX-Ray. Numerous other storage systems can be used in other embodiments.

Accordingly, illustrative embodiments can be implemented at least in part utilizing an extended engine plugin configured to support container distance measurement and clustering functionality as disclosed herein. Such an extended engine plugin can be configured to operate in conjunction with existing COW infrastructure such as a Docker engines backed by COW DeviceMapper and AUFS storage drivers. Other snapshot frameworks can be used in other embodiments.

Container distance measurement and clustering functionality such as that described above in conjunction with illustrative embodiments can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It should be noted that the particular arrangements illustrated in FIGS. 1 through 8 are presented by way of illustrative example only, and should not be construed as limiting in any way. As noted above, the described container measurement and clustering functionality can be implemented using additional or alternative components. Accordingly, a wide variety of different container distance measurement and clustering arrangements can be used in other embodiments.

The illustrative embodiments described above provide significant advantages over conventional arrangements.

For example, some embodiments leverage container image layer structures to support accurate and efficient container distance measurements and associated clustering of containers based at least in part on those measurements. These embodiments in some cases utilize container image hash identifiers that are typically stored in container host device cache memory and therefore can be rapidly accessed.

Illustrative embodiments can facilitate the identification of similar container images using the actual content of those images rather than attached names, tags or other potentially inaccurate and misleading notation.

Accordingly, such embodiments can provide the most relevant search results and associated auto-tagging and recommendation functionality to users searching a container registry for particular types of containers. For example, given a particular user query characterizing a desired container image, a container distance measurement and clustering service can provide highly relevant search results including only the most similar container images based on their actual content. Such arrangements can be carried out in an automated and unsupervised fashion that leverages machine learning.

Illustrative embodiments can perform distance measurements and clustering for very large numbers of containers in a rapid, accurate and efficient manner that provides insights and features not available using conventional arrangements.

The disclosed techniques in some embodiments help to support enhanced container security by facilitating the detection of potentially fraudulent containers. For example, such container may have names or tags that are deliberately misdescriptive in order to confuse users and mislead them into deploying an inappropriate container. Illustrative embodiments can allow users to avoid such situations.

Illustrative embodiments provide a quantitative approach to measuring the distance between a given pair of containers based on the layers of their respective container image layer structures. Such distance measurements provide the foundation for an effective clustering service with widespread application.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as nodes 102, or portions thereof, are illustratively implemented for use by respective tenants of such a multi-tenant environment.

As mentioned previously, cloud infrastructure as disclosed herein can include cloud-based systems such as AWS, GCP and Microsoft Azure. Virtual machines provided in such systems can be used to implement containers that are grouped based on layer structures and possibly other parameters for purposes of container management and data services in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
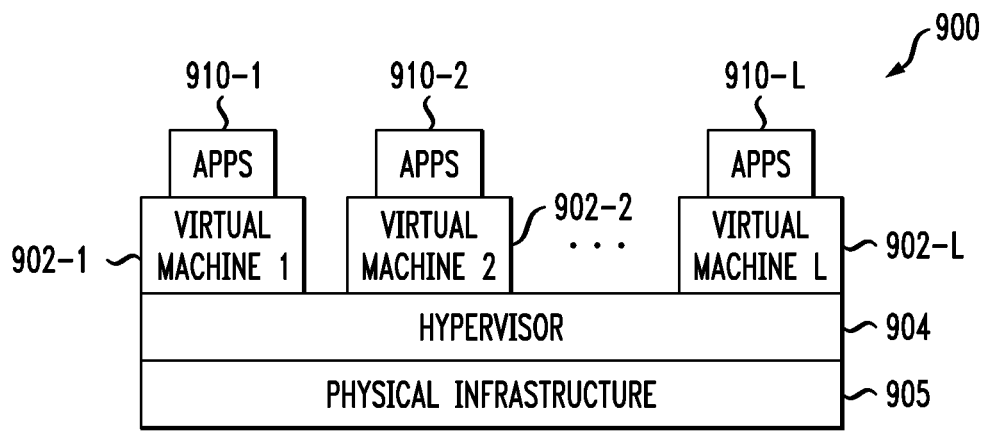
FIGS. 9 and 10 show examples of processing platforms that may be utilized to implement at least a portion of an information processing system in illustrative embodiments.
Figure 10:
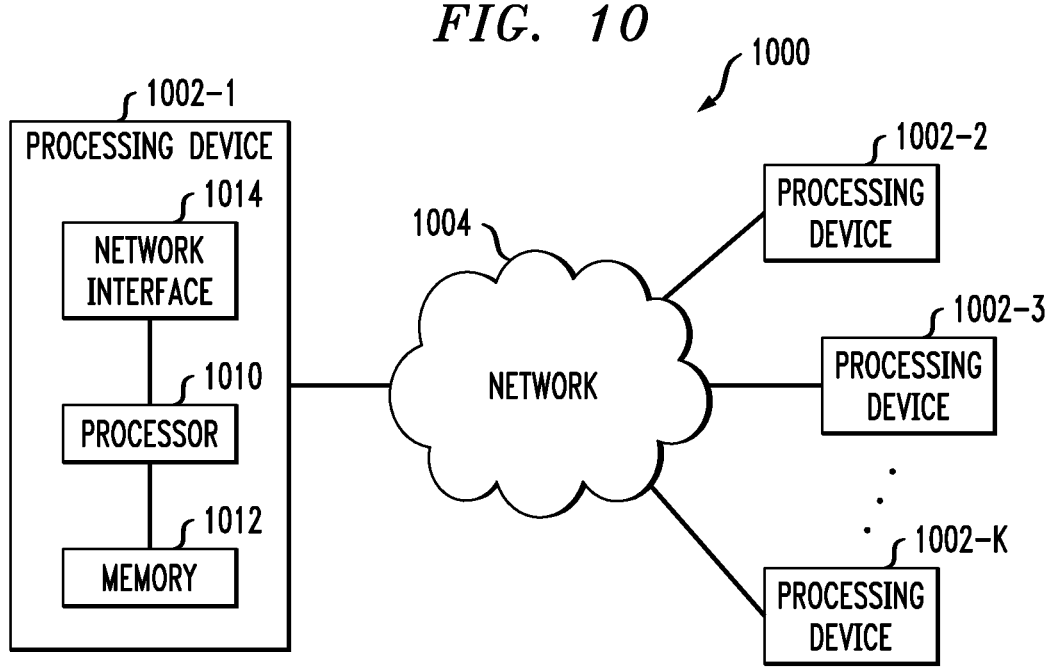

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a hypervisor platform that may be used to implement hypervisor 904 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure from VCE, the Virtual Computing Environment Company, now the Converged Platform and Solutions Division of Dell EMC.

These and numerous other alternative cloud computing environments can be configured to implement container distance measurement and clustering as disclosed herein.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of container groups and associated data services are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, cloud infrastructure, processing platforms, nodes, containers, container host devices, container distance measurement and clustering techniques, drivers, data services and storage systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   a plurality of container host devices;
   the container host devices implementing a plurality of containers for executing applications on behalf of one or more tenants of cloud infrastructure;
   wherein one or more of the container host devices are each configured to compute distance measures between respective pairs of the containers and to assign the containers to container clusters based at least in part on the distance measures;
   wherein the distance measures are computed as respective content-based distance measures between hash identifiers of respective layers of layer structures of the corresponding containers;
   wherein a given one of the layer structures comprises:
   one or more read-only layers each associated with one or more container images; and
   one or more read-write layers each associated with at least one running instance of at least one of the containers;
   wherein assigning the containers to the container clusters comprises sorting distance measures for respective pairs of the containers in a designated order and applying at least one filter to the sorted distance measures to assign particular pairs of the containers to particular ones of the container clusters; and
   wherein the assignment of the containers to container clusters based at least in part on the distance measures facilitates identification of containers that exhibit at least a specified degree of similarity to one another in their respective content;
   the container host devices being implemented on at least one processing platform comprising a processor coupled to a memory.

2. The apparatus of claim 1 wherein at least a subset of the container host devices comprise respective virtual machines controlled by a hypervisor of the processing platform.

3. The apparatus of claim 1 wherein the container host devices are configured as a plurality of nodes each comprising a plurality of containers and sharing a common storage system.

4. The apparatus of claim 1 further comprising an interface configured to present a visualization of the container clusters.

5. The apparatus of claim 4 wherein the visualization comprises a distance matrix having rows and columns corresponding to respective ones of the containers and entries corresponding to the computed distance measures between respective pairs of the containers.

6. The apparatus of claim 4 wherein the interface is configured to support entry of user feedback and wherein at least one parameter of the computation of distance measures and the assignment of clusters to container clusters is altered based at least in part on user feedback received via the interface.

7. The apparatus of claim 1 wherein the distance measure for a given one of the pairs of containers is computed as a Hamming distance between hash identifiers of respective layers of layers structures of the corresponding containers.

8. The apparatus of claim 7 wherein the Hamming distance for the given one of the pairs of containers is computed as:

$$d = C/\min(X, Y)$$

where d is the Hamming distance, C denotes a count of mismatched layers between the layer structures of the corresponding containers, and X and Y denote respective total numbers of layers in the layer structures of the corresponding containers.

9. The apparatus of claim 1 wherein changes in the layer structures are tracked and the computation of distance measures and assignment of containers to container groups repeated such the container clusters vary dynamically over time.

10. The apparatus of claim 1 wherein different data services are implemented by each of one or more of the container host devices for different ones of the container clusters.

11. A method comprising:
    configuring a plurality of container host devices in cloud infrastructure;
    utilizing the container host devices to implement a plurality of containers for executing applications on behalf of one or more tenants of the cloud infrastructure;
    computing distance measures between respective pairs of the containers; and
    assigning the containers to container clusters based at least in part on the distance measures;
    wherein the distance measures are computed as respective content-based distance measures between hash identifiers of respective layers of layer structures of the corresponding containers;
    wherein a given one of the layer structures comprises:
    one or more read-only layers each associated with one or more container images; and
    one or more read-write layers each associated with at least one running instance of at least one of the containers;
    wherein assigning the containers to the container clusters comprises sorting distance measures for respective pairs of the containers in a designated order and applying at least one filter to the sorted distance measures to assign particular pairs of the containers to particular ones of the container clusters; and
    wherein the assignment of the containers to container clusters based at least in part on the distance measures facilitates identification of containers that exhibit at least a specified degree of similarity to one another in their respective content;
    the method being performed by at least one processing platform comprising a processor coupled to a memory.

12. The method of claim 11 further comprising:
    providing an interface configured to present a visualization of the container clusters;
    receiving user feedback via the interface; and
    altering at least one parameter of the computation of distance measures and the assignment of containers to container clusters based at least in part on the user feedback.

13. A computer program product comprising a non-transitory processor-readable storage medium having stored therein program code of one or more software programs, wherein the program code when executed by at least one processing platform comprising a processor coupled to a memory causes the processing platform:
    to configure a plurality of container host devices in cloud infrastructure;
    to utilize the container host devices to implement a plurality of containers for executing applications on behalf of one or more tenants of the cloud infrastructure;

to compute distance measures between respective pairs of the containers; and to assign the containers to container clusters based at least in part on the distance measures;

wherein the distance measures are computed as respective content-based distance measures between hash identifiers of respective layers of layer structures of the corresponding containers;

wherein a given one of the layer structures comprises:

one or more read-only layers each associated with one or more container images; and one or more read-write layers each associated with at least one running instance of at least one of the containers;

wherein assigning the containers to the container clusters comprises sorting distance measures for respective pairs of the containers in a designated order and applying at least one filter to the sorted distance measures to assign particular pairs of the containers to particular ones of the container clusters; and wherein the assignment of the containers to container clusters based at least in part on the distance measures facilitates identification of containers that exhibit at least a specified degree of similarity to one another in their respective content.

14. The computer program product of claim 13 wherein the program code when executed by said at least one processing platform further causes the processing platform:

to provide an interface configured to present a visualization of the container clusters;

to receive user feedback via the interface; and to alter at least one parameter of the computation of distance measures and the assignment of containers to container clusters based at least in part on the user feedback.

15. The computer program product of claim 14 wherein the visualization comprises a distance matrix having rows and columns corresponding to respective ones of the containers and entries corresponding to the computed distance measures between respective pairs of the containers.

16. The computer program product of claim 13 wherein the distance measure for a given one of the pairs of containers is computed as a Hamming distance between hash identifiers of respective layers of layers structures of the corresponding containers.

17. The computer program product of claim 16 wherein the Hamming distance for the given one of the pairs of containers is computed as:

$$d = C/\min(X,Y)$$

where d is the Hamming distance, C denotes a count of mismatched layers between the layer structures of the corresponding containers, and X and Y denote respective total numbers of layers in the layer structures of the corresponding containers.

18. The computer program product of claim 13 wherein changes in the layer structures are tracked and the computation of distance measures and assignment of containers to container groups repeated such the container clusters vary dynamically over time.

19. The computer program product of claim 13 wherein different data services are implemented by each of one or more of the container host devices for different ones of the container clusters.

20. The computer program product of claim 13 wherein the container host devices are configured as a plurality of nodes each comprising a plurality of containers and sharing a common storage system.

* * * * *